3,312,532
PROCESS FOR MAKING 6,9-DIAMMONO-
DECABORANE
Stanley Mutnick, Poughkeepsie, N.Y., and Marvin M. Fein, Westfield, and John E. Paustian, Whippany, N.J., assignors to Thiokol Chemical Corporation, Bristol, Pa., a corporation of Delaware
No Drawing. Filed Jan. 8, 1965, Ser. No. 425,112
2 Claims. (Cl. 23—358)

The present invention relates to a novel process for preparing compounds containing boron. More particularly, the invention relates to the preparation of 6,9-diammonodecaborane.

In recent years, there has been considerable interest in boron-containing compounds because the high heat of combustion of these compounds renders them useful as rocket fuels. According to the present invention, a boron compound has been prepared which is useful as a high-energy fuel and a fuel additive in solid propellant motors. When mixed with suitable oxidizers such as ammonium, potassium, or sodium perchlorates, ammonium nitrate, etc., the product 6,9-diammonodecaborane may be utilized as a high-energy fuel. Such propellant mixtures are compounded by a number of techniques known to the art. For example, the mixture may comprise from 5 to 35 parts by weight of boron-containing materials and from 65 to 95 parts by weight of solid oxidizing agents mixed therewith. In some cases the propellant may also be made by combining the boron compounds and oxidizers with a curable polymer, for example of the polysulfide, polyurethane, polyester or polyether types.

The present invention relates to an improved process for the preparation of 6,9-diammonodecaborane commonly called and referred to hereinafter as $A_2D$. $A_2D$ is a high energy compound particularly useful as an additive in solid propellant compositions. There has been need in the art for a safe and convenient process for the preparation of $A_2D$. The process previously used, whereby an intermediate product 6,9-diammonodecaborane hydrazinate was formed and then recrystallized from water to yield $A_2D$, had a number of serious disadvantages.

One such disadvantage of the prior art process was the requirement that 6,9-diammonodecaborane hydrazinate, hereinafter referred to as $HA_2D$, be formed in a benzene and hydrazine reaction medium. This medium, in combination with intermediate products synthesized during the reaction, forms an extremely explosive and hazardous material.

A second disadvantage in the prior art process relates to the fact that the solubility of $HA_2D$ in water is very low, e.g. less than 1%. Very large volumes of water were thus required for the process.

Applicants' process avoids these problems encountered in the process of the prior art and also allows the manufacture of $A_2D$ to be accomplished by a simple safe procedure comprising a single chemical reaction instead of the multi-step process of the prior art.

Applicants' process comprises reacting 6,9-bis(acetonitrile) decaborane with hydrazine in aqueous solution to form $A_2D$ and precipitating the $A_2D$ out of solution by adding water to the reaction mixture. Not only does this process avoid the problems associated with the prior art process in respect to hazardous reaction media and water volume, but substantially higher yields of product are achieved.

The bis(acetonitrilo) decaborane used in the process is the reaction product conveniently formed by reacting decaborane and acetonitrile in toluene at room temperature as described in the commonly owned copending application Serial No. 269,848 filed March 28, 1963 by Fein et al.

Hydrazine is used in the proces in that commercial form commonly called "85% hydrazine hydrate." Inasmuch as the common terminology refers to a percentage based on hydrazine hydrate, the amount of hydrazine ($N_2H_4$) present in the useful commercial solution is 54.4% hydrazine.

It is preferable to maintain the molar ratio of reactants above 15 parts hydrazine to 1 part bis(acetonitrilo) decaborane. If the molar ratio drops much below 15 to 1, a large yield of another high-energy compounds useful in rocket applications of the formula

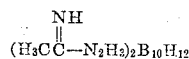

will be obtained as disclosed in commonly-owned copending application Serial No. 363,340 filed April 24, 1964, by Bobinski et al. However, very little, if any of $A_2D$ will be formed at these lower ratios.

The process of the present invention is conveniently carried out at temperatures between 30° and 100° C. and preferably between 50 and 90° C. In short, care should be taken to avoid either freezing or boiling the reaction mix. The precipitation step, wherein the concentration of hydrazine in the aqueous phase is decreased by addition of water causing the product to form a solid precipitate, is preferably carried out at as low a temperature as practical, i.e. about 0° C., to achieve the lowest solubility of the product in water and thus allow precipitation and recovery of the greatest quantity of product.

In order to point out more fully the nature of the present invention, the following specific examples are given as illustrative embodiments of the present process and products produced thereby.

EXAMPLE 1

48.25 ml. of 54.4% aqueous hydrazine (0.83 mol of hydrazine) was placed in a reaction vessel. To the aqueous hydrazine were added 10.1 grams (0.05 mol) of bis(acetonitrilo) decaborane. This mixture was heated to 85° C. and maintained at that temperature for 4 hours. After the 4-hour period had elapsed, one liter of water which had been chilled to 5° C. was added to the reaction mix causing the precipitation of a large quantity of a solid product. The product was dried to a constant weight and identified as 6,9-diammonodecaborane by an infrared analysis. A quantity of 7.5 grams of the product was recovered; this amount of product was 98.5% of the quantity of product theoretically obtainable from the reaction between bis(acetonitrilo) decaborane and hydrazine.

EXAMPLE 2

127.1 lbs. of 54.4% aqueous hydrazine were placed in a reaction vessel. To the hydrazine were added 106.9 lbs. of water and 48 lbs. of bis(acetonitrilo) decaborane. This mixture was heated to 80° C. and mainatined at that temperature for 10 hours. After the 10-hour period had elapsed, the mixture was cooled to room temperature, and 92 lbs. of ice were added to the reaction mix causing the precipitation of a large quantity of a solid product. The product was filtered and boiled in water to remove any excess hydrazine. The product was dried to a constant weight and shown to be 6,9-diammonodecaborane by infrared analysis. No more than 0.03% of hydrazine was present in the solid product. A quantity of 29 lbs. of the product was recovered; this amount of product was 83% of the quantity of product theoretically obtainable from the reaction between bis(acetonitrilo) decaborane and hydrazine in the amounts indicated above.

It is of course to be understood that the foregoing examples are intended to be illustrative and that numerous changes can be made in the reactants, proportions, and conditions set forth therein without departing from the spirit of the invention as defined in the appended claims.

What is claimed is:

1. A process comprising reacting bis(acetonitrilo) decaborane with hydrazine in an aqueous liquid medium to form 6,9-diammonodecaborane, causing the precipitation of the 6,9-diammonodecaborane product, and recovering said product.

2. A process comprising reacting at least 15 parts of hydrazine with one part of bis(acetonitrilo) decaborane in an aqueous liquid medium to form 6,9-diammonodecaborane, causing the precipitation of the 6,9-diammonodecaborane product, and recovering said product.

References Cited by the Examiner

UNITED STATES PATENTS

| 3,149,010 | 9/1964 | Armstrong | 149—36 |
| 3,169,045 | 2/1965 | Miller et al. | 23—14 |

OSCAR R. VERTIZ, *Primary Examiner.*

CARL D. QUARFORTH, *Examiner.*

L. A. SEBASTIAN, M. WEISSMAN,
*Assistant Examiners.*